United States Patent Office 2,964,485
Patented Dec. 13, 1960

2,964,485

COLOR STABILIZATION OF POLYVINYL ALKYL ETHER-HALOGENATED SOLVENT SYSTEMS WITH A HYDROGEN ACCEPTOR FROM THE GROUP CONSISTING OF BARIUM RICINOLEATE AND CADMIUM α-ETHYL CAPROATE

Anthony J. Martinelli, Easton, Pa., assignor to General Aniline & Film Corporation, New York, N.Y., a corporation of Delaware No Drawing. Filed Dec. 17, 1956, Ser. No. 628,508

3 Claims. (Cl. 260—23)

The invention here presented is a new process and a new composition of matter for the stabilization, against color change, of the various polyvinyl alkyl ethers utilizing a hydrogen halide acceptor to restrain changes which otherwise occur and lead to colored degradation products in halogenated solvent systems.

It has been found desirable for various applications to dissolve the various polyvinyl alkyl ethers in halogenated, or chlorinated solvents preparatory to the use of these compounds in the preparation of adhesives, binders and cements for the paper, textile, leather and paint fields, and for various reasons it is desirable to prepare these solutions well in advance of the date of utilization, and to store them during the interval. It is found however that such a procedure leads to discolored chlorinated solvent solutions, which tend to interfere with subsequent uses and to stain the produdcts resulting from such uses.

This situation has been found to be particularly difficult with solutions of polyvinyl methyl ether, polyvinyl ethyl ether, polyvinyl isopropyl ether and polyvinyl isobutyl ether dissolved in such solvents as ethylene dichloride, carbon tetrachloride, trichloroethylene and tetrachloroethylene. According to the present invention it is now found that excellent resistance to the development of undesirable colors can be obtained by the addition to the solution of the polyvinylalkyl ethers, an appropriate hydrogen chloride acceptor, such as epichlorohydrin and the like.

By the process of the invention there is thus added to a solution of polyvinyl alkyl ethers in chlorinated solvents, a small amount, on the order of 1% (based upon the amount of the polymer in the solution), of a hydrogen chloride acceptor whereby the discoloration of the solution is avoided for long periods of time. Other objects and details of the invention will be apparent from the following description.

The present invention applies primarily to solutions of polyvinyl alkyl ethers in chlorinated solvents. It is found that the chlorinated solvent breaks down slowly to liberate minor quantities of hydrogen chloride which attack the ether groups to form colored aldehyde derivatives. To prevent this change in color, there is, according to the present invention, added to the solution of the polymer in chlorinated solvent, an appropriate hydrogen chloride acceptor.

The primary material is a solution of a polyvinyl alkyl ether such as polyvinyl methyl ether, polyvinyl ethyl ether, polyvinyl isopropyl ether, polyvinyl isobutyl ether, polyvinyl n-butyl ether, polyvinyl isooctyl ether, polyvinyl n-dodecyl ether, and polyvinyl octadecyl ether, in a chlorinated solvent such as ethylene dichloride, carbon tetrachloride, trichloroethylene, tetrachloroethylene and the like, including such other compounds as chloroform, the various propyl chlorides, the butyl chlorides, the pentyl chlorides and various of the corresponding bromine compounds which are liquids.

To this mixture there is then added a small amount of a hydrogen chloride acceptor preferably within the range between 0.1% and 5% based on the amount of solute present in the solution. By this procedure solutions which will normally discolor badly in 3 to 5 days will remain in their original color for many months.

For the hydrogen chloride acceptor such substances as:

Epichlorohydrin
3-(x-nonylphenoxy)propylene oxide
Dibutyltin dilaurate
Paraplex G–60—epoxidized polyester
Monoplex S–71—epoxidized monoester
Admex 710—epoxidized soya product polyester
Barium ricinoleate
Cadmium α-ethyl caproate and the like may be used.

Thus the process of the invention stabilizes the color of a solution of a polyvinyl alkyl ether in a chlorinated solvent system by the use of a halogen acceptor to prevent reaction between the ether and hydrogen chloride produced by breakdown of the chlorinated solvent.

The following examples are offered as showing the best way now known of presenting the invention but they are not intended to limit the claims in any way.

EXAMPLE I

A series of 50% solutions of polyvinyl methyl ether (K value 45) were prepared in tetrachloroethylene solution, to which was added the halogen acceptors, and a portion of each solution was placed in a Gardner-Holdt bubble viscosity tube. Each portion of these solutions contained 1% of one of the above hydrogen chloride acceptors, except for the control solution to which nothing was added. As prepared, all of the solutions were in the 9 to 10 color range according to the Gardner 1933 color standards (as later set out).

After four months' storage at room temperature the untreated controls were rated 17 on the color standard. All of the treated solutions were still in the 9 to 10 Gardner color range after one year storage. Simultaneously a sample of each composition, as above set out, was stored in an oven at 60° C. At this storage temperature the untreated controls turned brown, to 17 on the Gardner color standard, in three days. All of the treated solutions remain in the 9 to 10 color range for one month at 60° C.

The Gardner-Holdt bubble viscosities did not change appreciably over a three-week period, treated or untreated. The room temperature storage products ranged from 24,500 centistokes to 31,400 centistokes in one year. At 60° C. storage, the room temperature viscosity ranged from 23,000 centistokes to 28,600 centistokes in one month.

To show the degree of color increase, the following transcript of the color scale terminology is offered:

*Table 1*

COLOR SCALE TERMINOLOGY

| Gardner Standards 1933 | Unofficial Description of the Color | N.P.A. Scales (Approx. Correl, with G.S. 1933) | |
|---|---|---|---|
| | | Numerical | Nominal |
| 1 | Colorless | 1 | Lily white. |
| 4 | Slightly colored | 1.5 | Cream white. |
| 9 | Light amber | 2.5 | Extra lemon pale. |
| 12 | Dull yellow-orange | 4 | Orange pale. |
| 15 | Medium amber | 5 | Light red. |
| 18 | Dark amber | 8 | Extra dark red. |

EXAMPLE 2

The procedure of Example 1 was repeated using polyvinyl isobutyl ether (K value of 52.5) which was stabilized to color formation at room temperature and at 60° C.

storage by the addition thereto of 3% hydrogen chloride acceptors, as shown in the above chart, and an excellent stabilization to color formation was obtained.

EXAMPLE 3

Similar solutions of polyvinyl ethyl ether (K value 92) were similarly prepared in tetrachloroethylene solution and amounts of approximately 2% of the hydrogen chloride acceptors from the above list were added to the solutions as in Example 1, and again an excellent stabilization against color formation was obtained, both at room temperature and at 60° C. storage.

EXAMPLE 4

Similar procedures to Example 1 were conducted with polyvinyl isopropyl ether (K value 60) and again good protection was obtained against color formation.

EXAMPLE 5

A similar series of polyvinyl octadecyl ether (K value 36) were prepared as in Example 1, containing 5% of the hydrogen chloride acceptors, as shown in the above list, were used. Again an excellent protection against color changes was obtained.

Thus by the simple procedure of adding a hydrogen chloride acceptor to a solution of polymeric vinyl ether in chlorinated solvents, it becomes possible to maintain the original low color value for many months both at room temperature and at elevated temperatures.

While there are above disclosed but a limited number of embodiments of the process and product of the invention it is possible to provide still other embodiments without departing from the inventive concept herein disclosed, and it is therefore desired that only such limitations be imposed upon the appended claims as are stated therein or required by the prior art.

The invention claimed is:

1. A color-stable solution of a polyvinyl alkyl ether in a chlorinated hydrocarbon having at most 2 carbon atoms as solvent, the stabilization of the color being effected by the presence in said solution of an effective amount of a hydrogen chloride acceptor selected from the group consisting of barium ricinoleate and cadmium α-ethyl caproate.

2. A color-stable solution of a polyvinyl alkyl ether in a chlorinated hydrocarbon having at most 2 carbon atoms as solvent, the stabilization of the color being effected by the presence in said solution of from 0.1 to 5%, based on the weight of the polyvinyl ether in the solution, of a hydrogen chloride acceptor selected from the group consisting of barium ricinoleate and cadmium α-ethyl caproate.

3. A color-stable solution of polyvinyl methyl ether having a K value of 45 in tetrachloroethylene as solvent, the stabilization of the color being effected by the presence in said solution of 1% of a hydrogen chloride acceptor selected from the group consisting of barium ricinoleate and cadmium α-ethyl caproate.

References Cited in the file of this patent

UNITED STATES PATENTS

| | | |
|---|---|---|
| 2,075,543 | Reed | Mar. 30, 1937 |
| 2,364,588 | Morris | Dec. 5, 1944 |
| 2,371,644 | Petering | Mar. 20, 1945 |
| 2,616,879 | Zoss | Nov. 4, 1952 |

OTHER REFERENCES

Schildknecht: "Vinyl and Related Polymers," page 606, Wiley (1952).

De Bell et al.: "German Plastics Practice," page 475, Murray Printing Co., Cambridge, Mass. (1944).

Schildknecht: Ind. Eng. Chem., 39, 184–186 (February 1947).